United States Patent Office 3,342,358
Patented Sept. 19, 1967

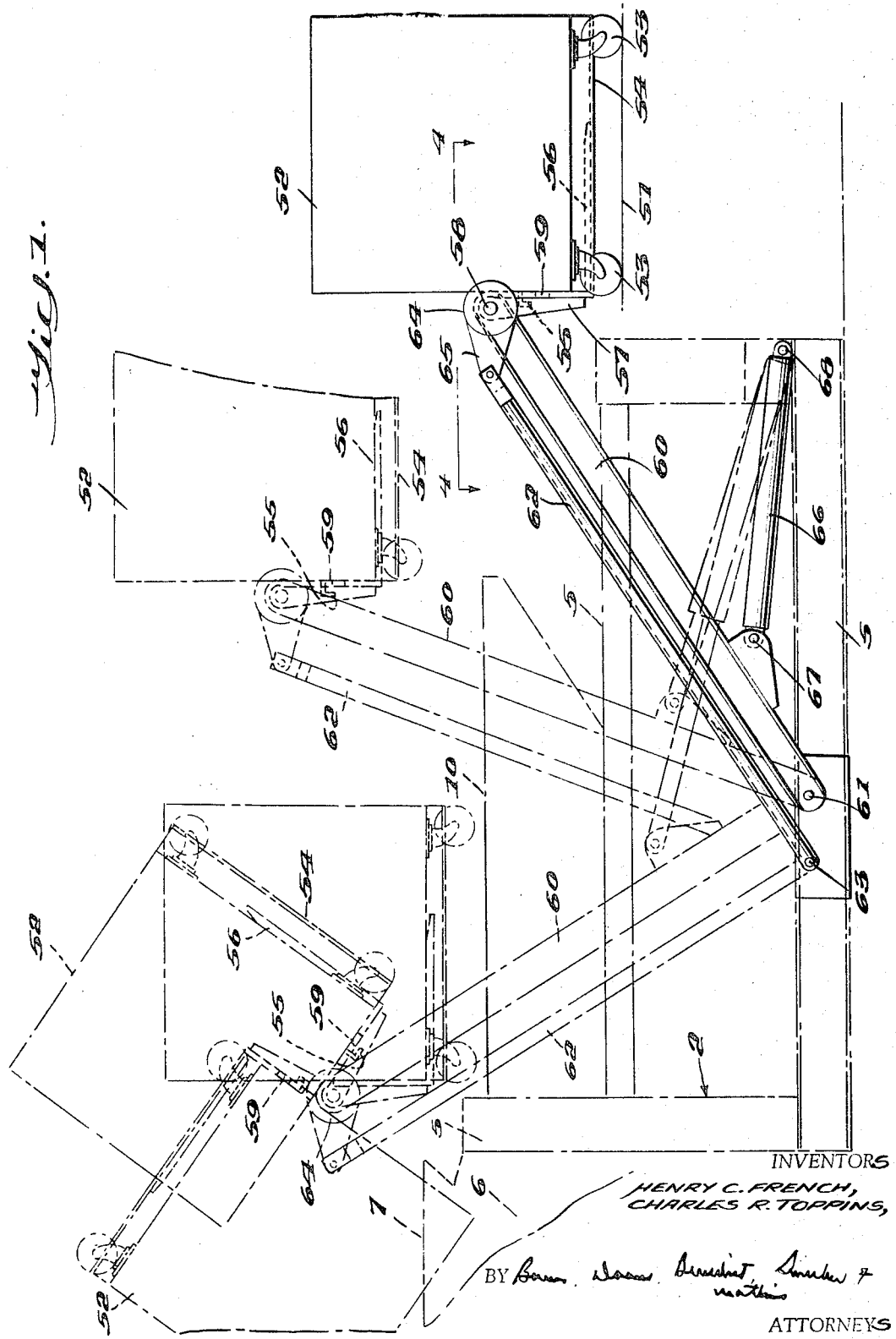

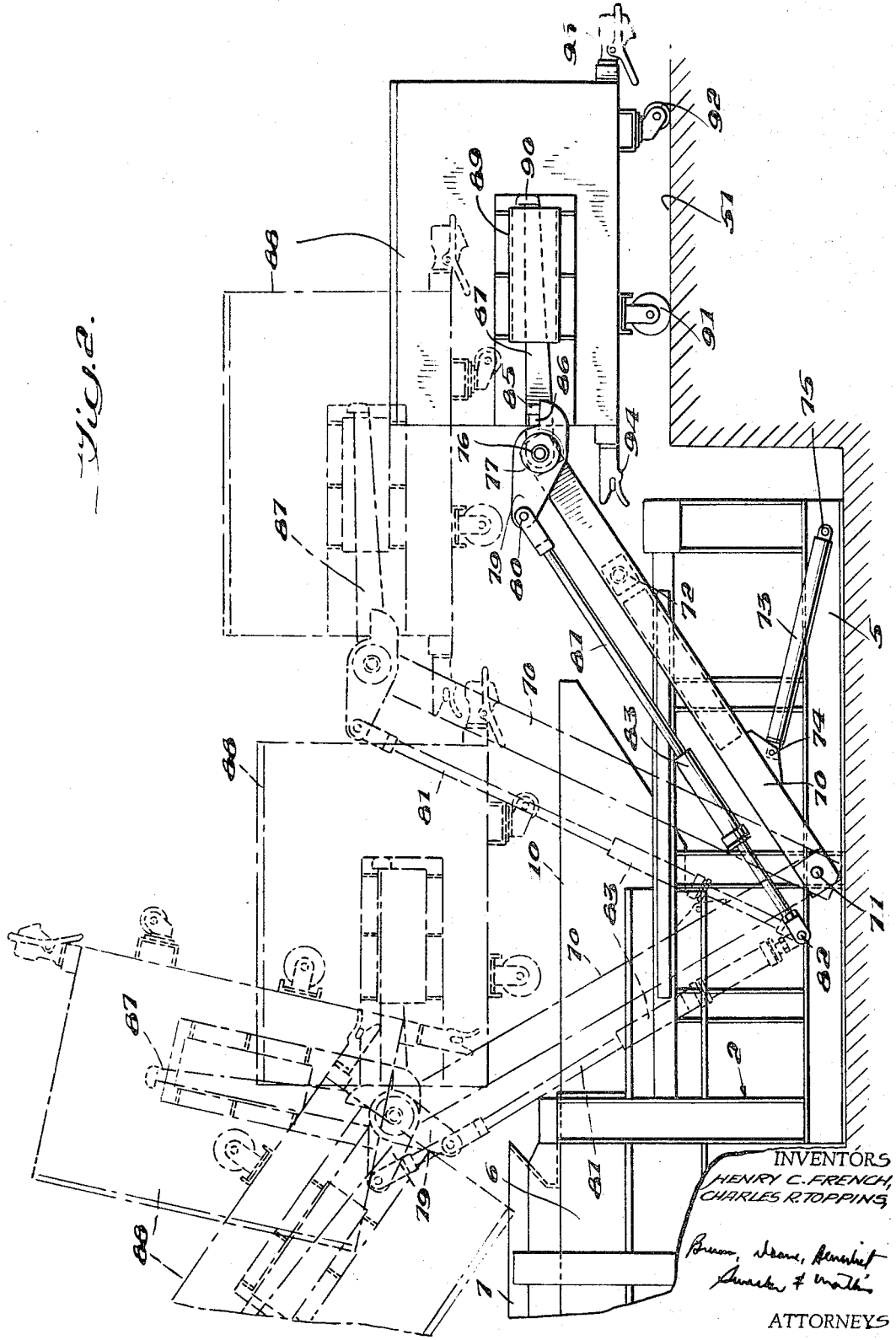

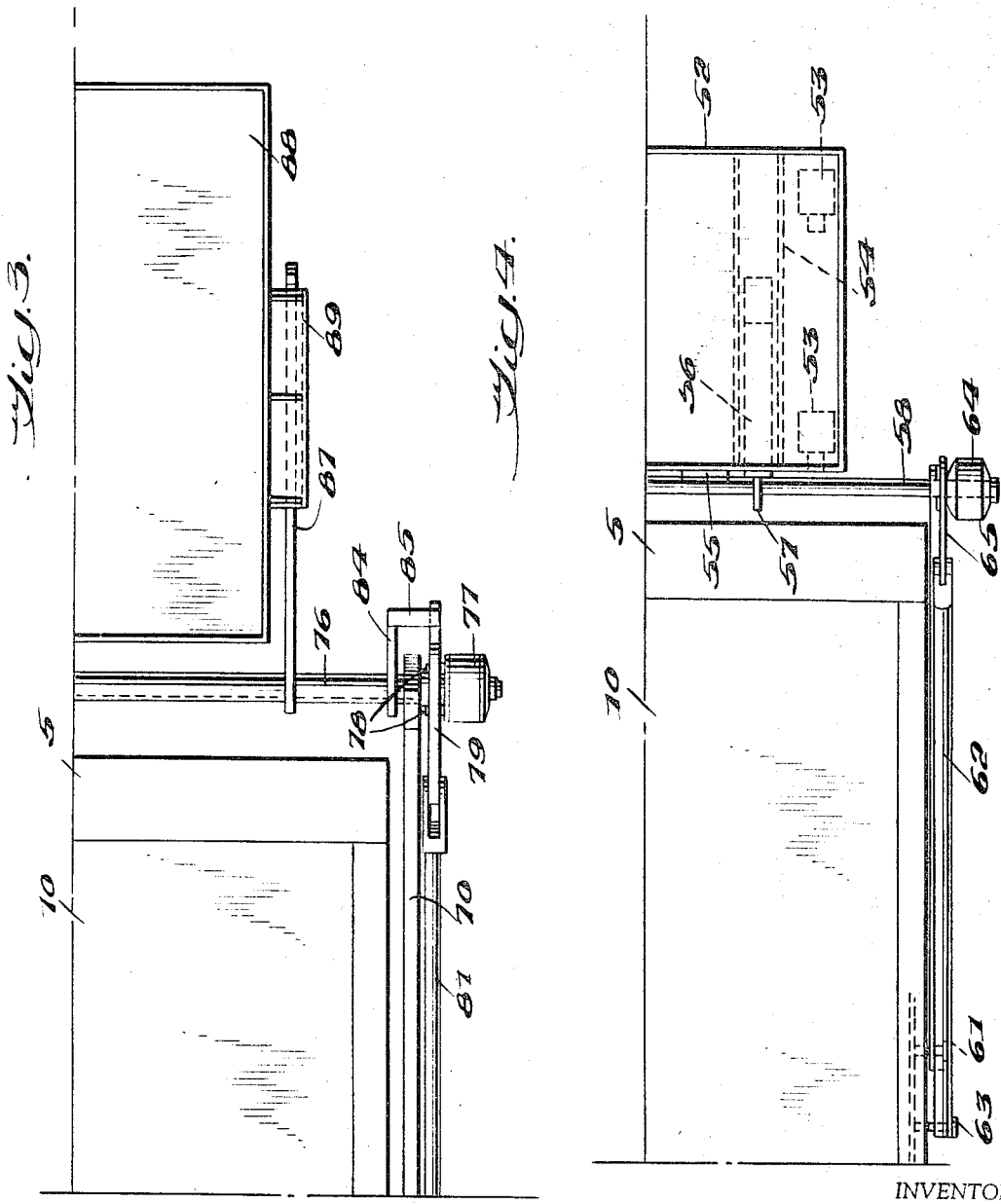

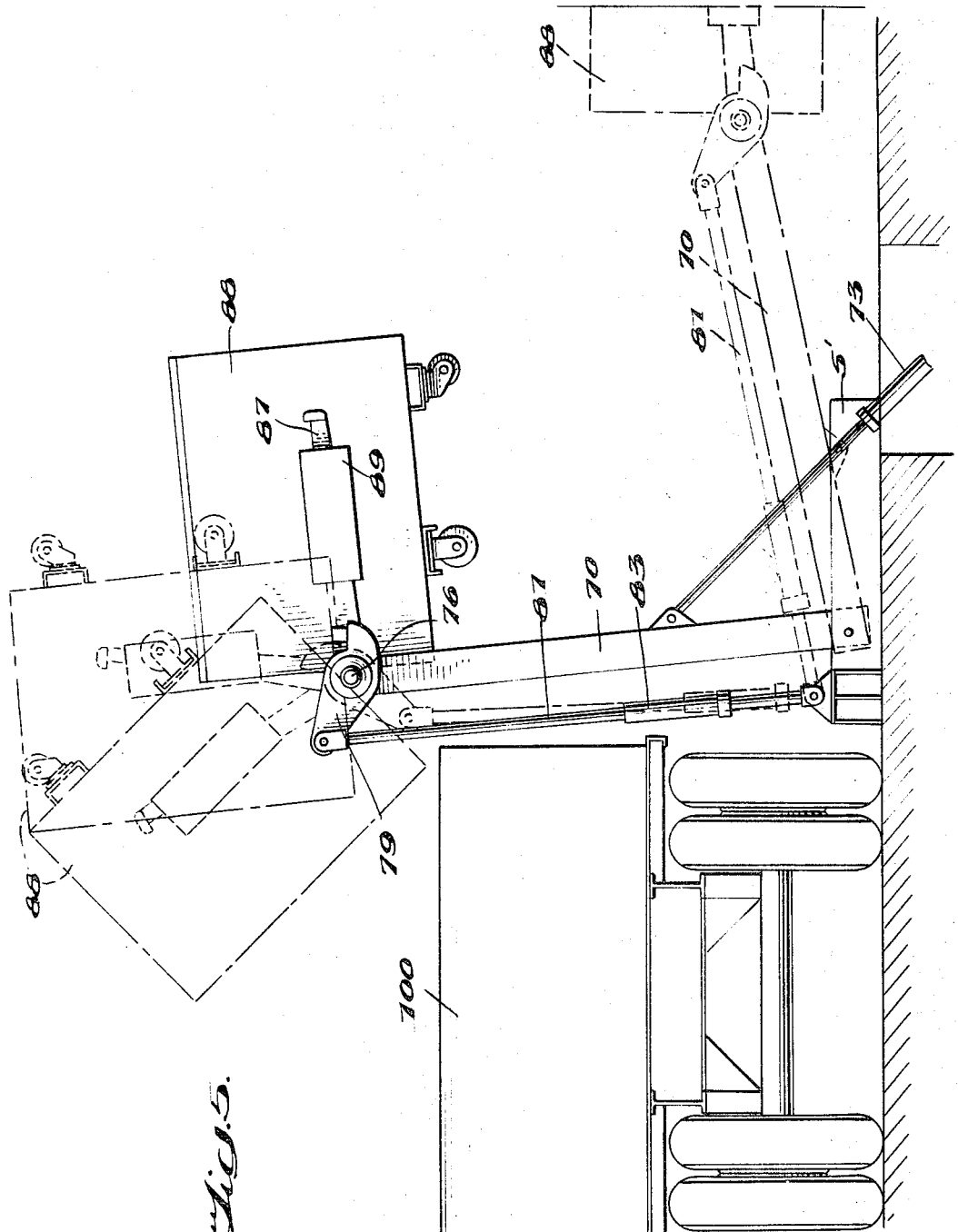

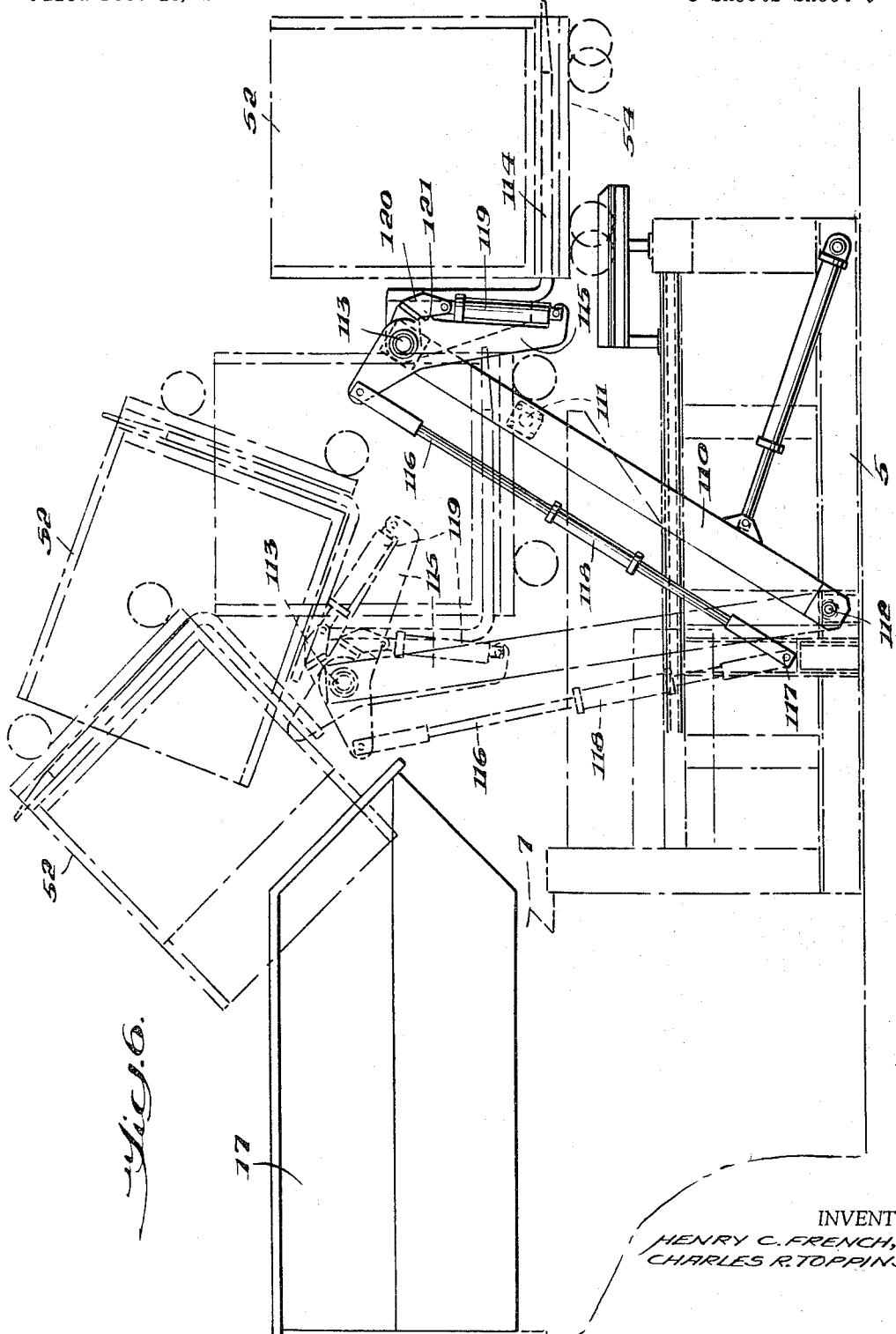

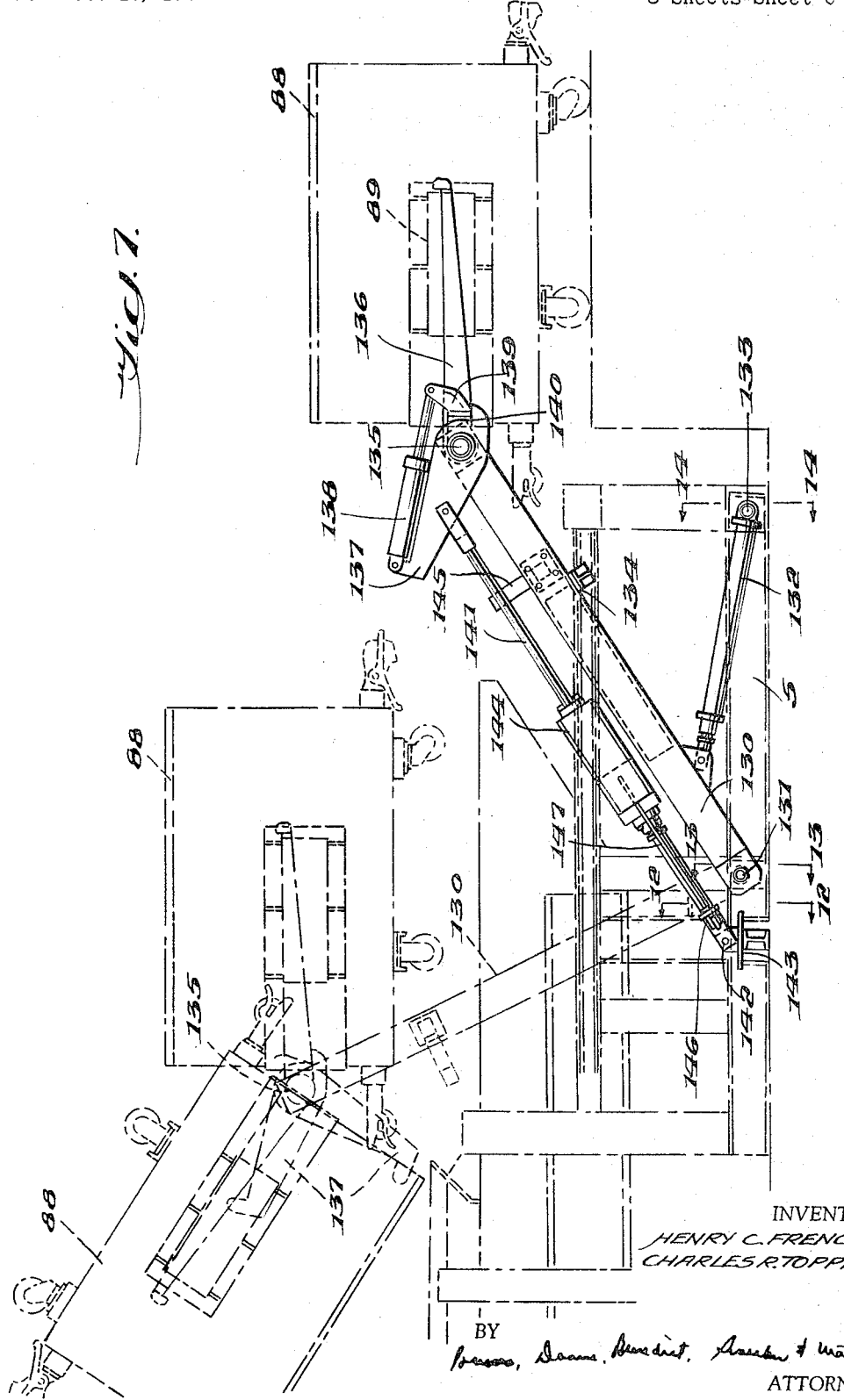

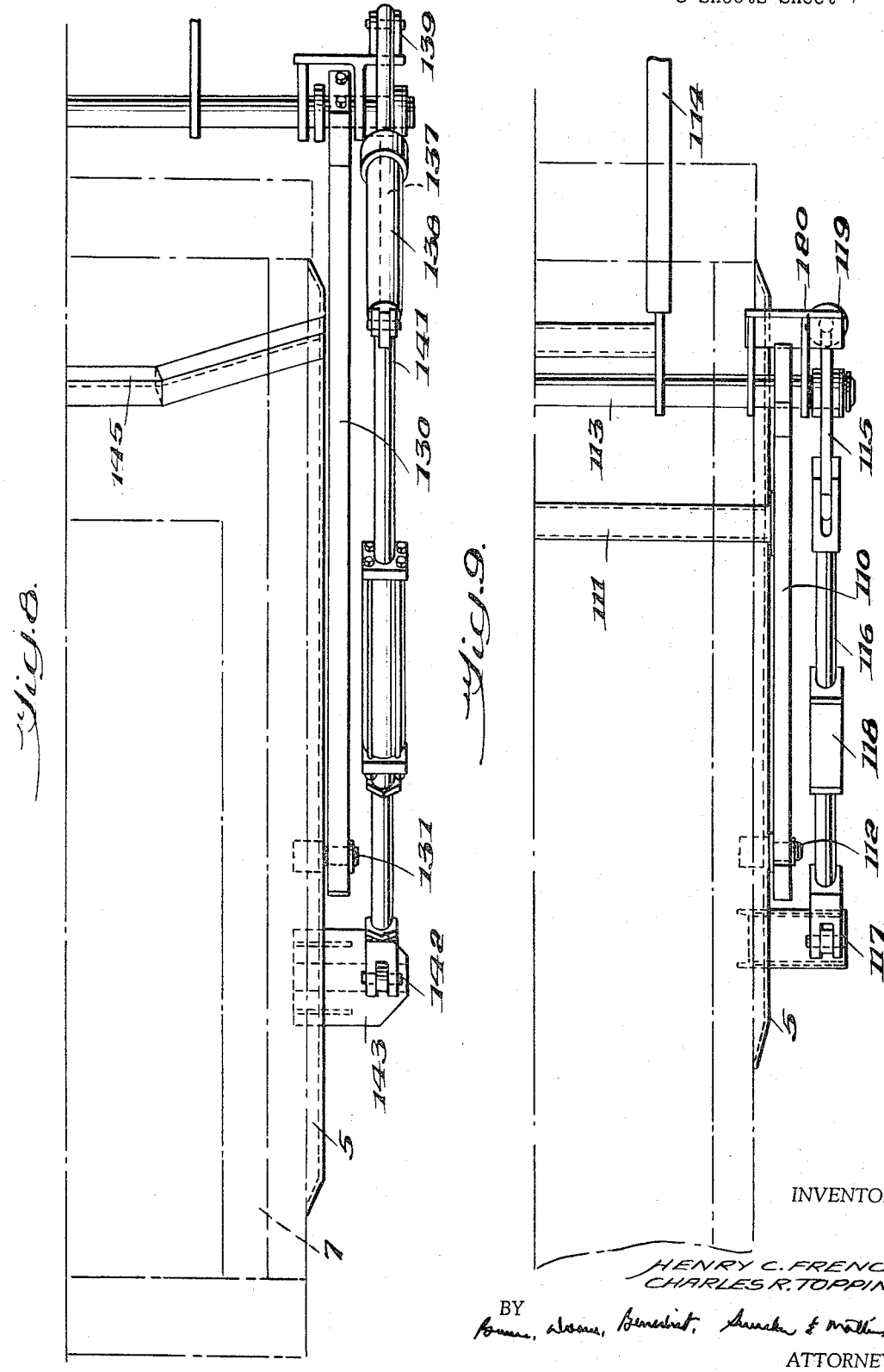

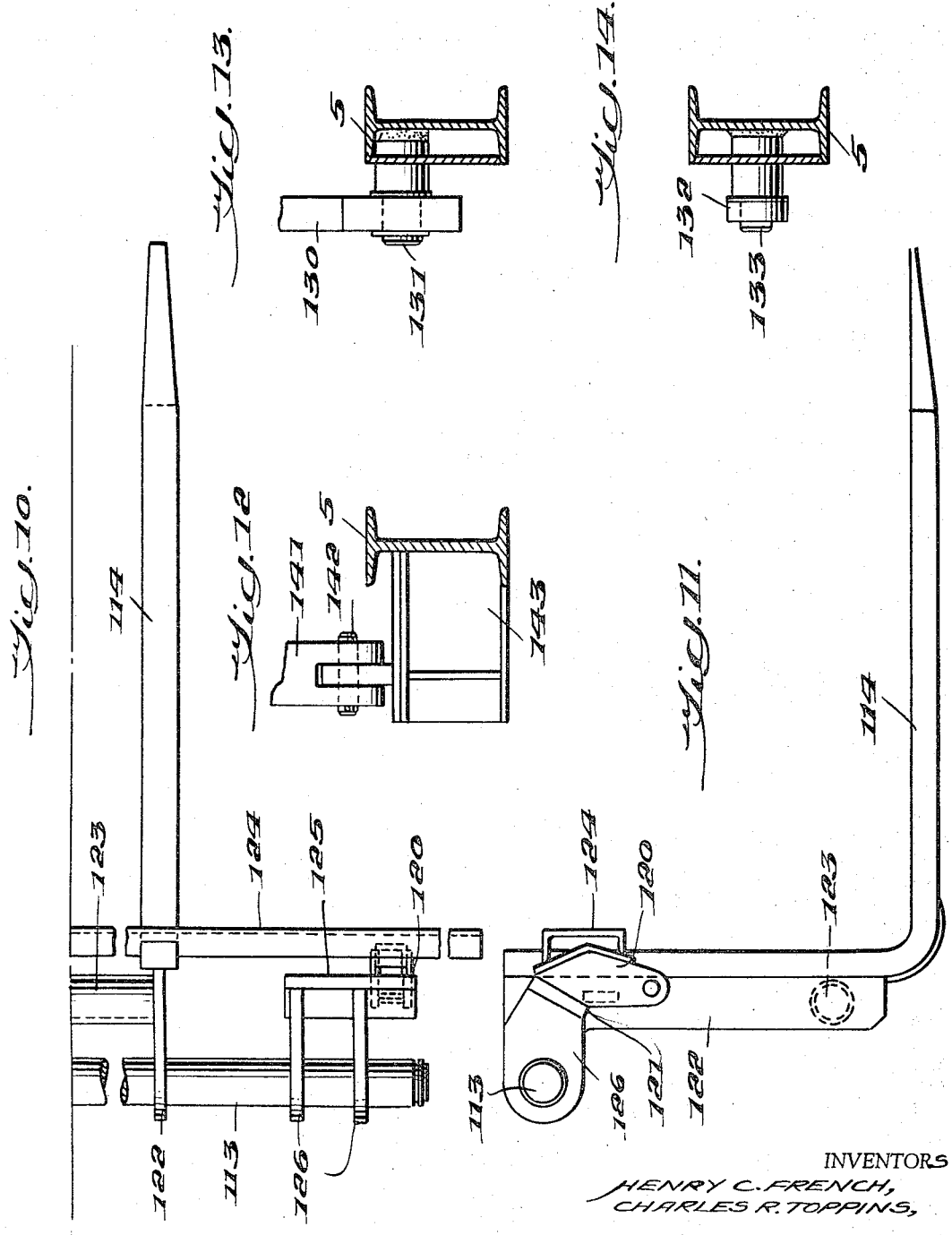

3,342,358
CONTAINER DUMPING DEVICES
Henry C. French and Charles R. Toppins, Knoxville, Tenn., assignors to Dempster Brothers, Inc., Knoxville, Tenn., a corporation of Tennessee
Filed Dec. 15, 1965, Ser. No. 514,068
9 Claims. (Cl. 214—302)

This application is a continuation-in-part of our application filed February 17, 1965, Ser. No. 433,445 now abandoned.

This invention relates to improvements in container dumping devices and, more particularly, to devices for picking up a filled refuse container and dumping the contents thereof into a receptacle such, for example, as a packer assembly, transport vehicle or the like.

Refuse is often accumulated in and around the buildings such as factories, apartment houses, stores, etc. At each of these points of accumulation a relatively large container is used to receive such refuse, which container is often of a size of from two to three cubic yards in capacity and is frequently mounted on casters or wheels so as to move the container out of the building to an adjacent or remote point for removal of the refuse therefrom. Such a container is relatively heavy, too heavy to be lifted manually and requires power means for picking up and dumping the contents therefrom. Such power means may be provided either on the transport vehicle, if one is used, or in a stationary position.

One object of this invention is to provide for the dumping of containers to discharge the contents therefrom into a suitable receptacle as, for example, a stationary packer assembly, a transport vehicle or the like.

Another object of the invention is to provide for the detachable engagement of the dumping device with a container, and the movement of the container in a substantially level position to a point over or above the receptacle therefor, at which position the container is tipped over to dump the contents therefrom.

According to certain embodiments of the invention, the refuse container is moved from the point of accumulation of the refuse to the point of dumping as, for example, on a dock or other elevated surface. The container dumping device comprises a torque member having a pair of forks arranged to be engaged detachably with suitable connections on the container so that upon lifting movement of the torque member the container will be lifted bodily.

The lifting means for the torque member and container preferably comprises a pantograph device of which the torque member is a part and on which the container is moved in a level position without tipping to a point adjacent the receptacle for the refuse. Means is provided for rotating the torque member in proximity to the receptacle to tip over the container or to turn it substantially to an inverted position to discharge the contents therefrom. The pantograph device then returns the container to an upright position and moves it back to its initial supported position on the ground or dock from which it may be returned to the point of accumulation of the refuse.

Certain embodiments of the invention are illustrated in the accompanying drawings, in which:

FIG. 1 is a side elevation showing one form of the container dumping device, with the parts indicated in different positions;

FIG. 2 is a side elevation of a modified form of the device on a stationary packer;

FIG. 3 is a top plan view of a portion of the latter form;

FIG. 4 is a top plan view of a portion of the form shown in FIG. 1 and taken substantially on the line 4—4 in FIG. 1;

FIG. 5 is a side elevation showing the invention as used for dumping into a transport vehicle;

FIG. 6 is a side elevation of a further modified form of the device applied for the loading of a stationary packer;

FIG. 7 is a similar view showing still another modification thereof;

FIG. 8 is a partial top plan view of the form shown in FIG. 7;

FIG. 9 is a partial top plan view of the form shown in FIG. 6;

FIG. 10 is a partial top plan view of the torque shaft and fork assembly thereof, shown in FIG. 6;

FIG. 11 is a side elevation of the said torque shaft and fork assembly, shown in FIG. 6;

FIG. 12 is a detail cross section on the line 12—12 in FIG. 7;

FIG. 13 is a detail cross section on the line 13—13 in FIG. 7; and

FIG. 14 is a detail cross section on the line 14—14 in FIG. 7.

The invention is shown in FIGS. 1 to 4, 6 and 7, as applied to or used in connection with a stationary packer, although it will be recognized that it may be used for many other applications such, for example, as the loading of a transport vehicle (FIG. 5). The stationary packer illustrated as an example is designated generally at 2 and comprises a supporting frame 5. Mounted within and supported by the frame 5 is a charging chamber 6 having an inlet opening in the top thereof formed by a hopper 7.

The charging chamber 6 has a compacting head reciprocably mounted therein in a horizontal direction, which head has a shield 10 connected therewith normally retracted in the position shown in FIGS. 1 and 2, but being capable of movement horizontally with the head so that upon advancing movement of the head in the chamber 6 the shield 10 moves across the inlet opening. This prevents the falling of refuse behind the head when the latter is advanced and yet, upon retracting movement of the head, the refuse that may have been deposited on the shield during such advance movement will be dropped into the charging chamber 6.

This form of stationary packer is illustrated in a co-pending application to which reference may be had for a further understanding of its construction and operation.

As described above, the refuse will be accumulated ordinarily in a portable container which can be moved to a point adjacent the loading mechanism as, for example, onto a dock, generally designated at 51. This dock 51 may be at any desired height, although usually it will be elevated above the bottom of the packer assembly and it is preferred that it be of some elevation for facilitating the dumping of the contents therefrom.

The filling container shown in FIG. 1 is illustrated generally at 52 and is provided with rollers 53 on the bottom thereof, which may be swivelled, for moving the container to and from a point of accumulation of the refuse and back to the point of dumping. While the filling container may be moved along a level even with the base of the packer assembly, it is shown in FIG. 1 as supported upon a dock 51 in a somewhat elevated position with respect thereto.

In the embodiment shown in FIGS. 1 and 4, sleeves 54 extend along the bottom of the filling container 52 in laterally spaced relation, open at the end toward the left in FIG. 1, and both ends may be open if desired. The side wall of the filling container 52 toward the packer assembly is also provided with a pair of laterally spaced hooks or clip angles 55, see FIG. 4.

The sleeves 54 are in position to receive forks 56 carried by depending arms 57 which are rigidly fixed on and extend downwardly from a torque member or shaft 58. A lock bar 59 extends in bridging relation between and is securely fastened to the depending arms 57 in position to engage the hooks or clip angles 55.

The torque shaft 58 is journaled in the outer ends of a pair of lifting arms 60 pivotally mounted at 61 on the frame 5 of the packer assembly. Extending parallel with and beside each lifting arm 60 is a link 62 also pivotally supported at 63 on the frame 5.

Mounted on opposite ends of the torque shaft 58 are hydraulic rotary actuators 64, the rotor of each of which is fixed to the shaft 58, while the housing of the hydraulic actuator 64 is fixed rigidly to one end of an arm 65. The opposite end of the arm 65 is pivotally connected with the upper end of the link 62. This assembly forms a pantograph and maintains the parts 60 and 62 in parallel relation in the different positions of swinging movement thereof.

Each of the lifting arms 60 is provided with a double-acting hydraulic power cylinder 66 pivotally connected at one end, at 67, to the lifting arm 60 and pivotally mounted at 68 on the base frame 5 of the packer assembly.

This filling assembly will pick up and dump a container 52, lifting and transporting the container from the dock 51 in a level position to the packer assembly, at which latter point it will rotate the container, thereby discharging the contents into the hopper 7, generally as illustrated in the several positions shown in full lines and in dotted lines in FIG. 1.

The container 52 is moved from the points of accumulation on the rollers 53 to the full line position shown in FIG. 1, at which latter point the channels or sleeves 54 on the bottom of the container are telescoped with the forks 56 therein and with the clip angle locks 55 in position to engage over the lock bar 59 when the container is lifted.

After thus positioning the container with respect to the dumping assembly, the hydraulic cylinders 66 are energized to swing the lifting arms 60 forward toward the hopper 7. At the same time the links 62 will act on the shaft 58 through the hydraulic actuators 64 so as to maintain the container in level position until the lifting arms 60 have moved substantially to the forwardmost positions shown in dotted lines in FIG. 1, when the container will still be upright but substantially at the end of the hopper 7. Upon reaching this position, the hydraulic actuators 64 will be energized to rotate the shaft 58 in a counterclockwise direction as viewed in FIG. 1, thereby acting to swing the container substantially to the upside down position shown for dumping the contents of the container into the hopper 7.

Thereafter, the actuators 64 are reversed to turn the container back to an upright positon on the lifting arms 60, and the cylinders 66 are likewise reversed to return the container back to its supported position on the dock 51.

When the container is lifted off the dock by the forks 56, there is sufficient play within the channels 54 so that the clip locks 55 will engage over the lock bar 59 and will remain thereover through the dumping cycle until the container is turned to its upside down position, shown at the left in FIG. 1. Thus, the container is locked in place on the lifting arms 60 at all times while it is being handled in an elevated position, except in full dumping position over the hopper. As soon as it is returned to the dock 51, these locks 55-59 disengage so the container is free therefrom and capable of being rolled away from the dumping mechanism without requiring positive unlocking.

Where the dumping device is used in connection with large containers or heavy loads, the hydraulic actuators 64 may not be of sufficient size and capacity to rotate the container and load around the axis of the torque member 58 in dumping position. In that event, some additional turning power may be needed, examples of which are illustrated in FIGS. 2, 3, 6 and 7.

In the form of the invention, shown in FIGS. 2 and 3, the lifting arms are indicated at 70, spaced apart on opposite sides of the loader or other device and journaled at 71 on the frame 5 thereof. These lifting arms may be connected together, if desired, by a tie rod 72 near the outer ends thereof. Hydraulic cylinders are shown at 73, pivotally connected at one end at 74 to the respective arms 70 and at the opposite end at 75 to the frame 5, for swinging the arms 70 through their cycle of movement, as exemplified by the full line and dotted line illustrations in FIG. 2, substantially as described above in connection with FIG. 1.

The torque shaft is shown at 76, which extends transversely of the upper end of each of the loading arms 70. This torque shaft 76 is connected at its opposite ends with the rotors of hydraulic actuators 77. The housing of each actuator 77 is fixed at 78 (FIG. 3) to an arm 79 that extends transversely to opposite sides of the torque shaft 76. At one end, the arm 79 is pivotally connected at 80 with a link member, generally designated at 81. This link member 81 extends parallel with the loading arm 70 from the pivot 80 to a journal bearing 82 on the supporting frame of the structure.

The link member 81 includes a hydraulic dumping cylinder 83 intermediate the length thereof, the cylinder member of which is connected with one end portion of the link member 81 while the piston rod thereof is connected with the opposite end portion of the link member so as to expand and contract the length of the link member.

The arm 79 is free to turn in one direction about the axis of the shaft 76, but it is desired to limit the swinging movement thereof in the opposite direction. Accordingly, we have provided a stop member 84 fixed upon the torque shaft 76 and extending laterally therefrom, as illustrated in FIG. 3, with an offset arm 85 on said stop member 84 extending into overlapping relation with a shoulder 86 on the free outer end of the arm 79.

Thus, upon rotation of the arm 79 in a counterclockwise direction, as viewed in FIG. 2, the shoulder 86 will engage the stop arm 85 and thereby prevent further movement of the arm 79 relative to the torque shaft 76. Additional movement of the arm 79 will cause rotation of the torque shaft.

In this form of the invention a pair of forks are shown at 87, each of which is fixed at one end thereof to the torque shaft 76 and they extend outwardly from the torque shaft in parallel relation and spaced apart sufficiently to receive a container 88 therebetween, as will be apparent from FIGS. 2 and 3. Sleeves are provided on opposite ends of the container 88, as indicated at 89, which are open at opposite ends and tubular in form, through which the dumping forks 87 may extend. At the free ends of the forks 87 tangs 90 are provided so that upon lifting motion of the container 88 by the forks 87, the tangs 90 will engage the ends of the sleeves and thereby prevent the container from slipping off the forks during the dumping operation.

The container 88 preferably is portable and capable of being moved to and from the point of accumulation of the refuse. Accordingly, it is shown as supported on wheels 91 and 92, the latter of which may be swivelled so as to permit freedom of movement of the container to and from the dumping device.

Couplings 94 and 95 are shown as provided on opposite ends of the container, being of conventional shape and character, to enable the container to be coupled in a train or pulled for transport to different locations.

When the container 88 is moved on the dock 51 or into position for engagement by the forks 87 of the dumping device, if no dock be used, the container is positioned initially substantially in the relation to the dumping forks 87 as shown in FIGS. 2 and 3. Thus, the container is moved between the forks with the latter extending through the sleeves 89. The parts in this relation are then ready for dumping of the container.

The cylinders 73 should then be actuated to swing the loading arms 70 in a counterclockwise direction as viewed in FIG. 2. This bodily swinging movement of the loading arms 70 will cause the forks 87 to lift the container bodily and transport it substantially to the dumping position. The pantograph action of the parallel arms and links 70 and 81 holds the container level throughout this travel and thereby eliminates any spillage of material, as well as adding to the safety of the operation.

When the container reaches its dumping position, the arms 79 that control the position of the dumping forks will be substantially horizontal or only slightly inclined above the horizontal, as indicated at the left in FIG. 2. Then, upon contraction of the cylinders 83 in the links 81, these links are shortened.

Inasmuch as the lower ends of the links 81 are fixed at 82 against endwise displacement, the upper ends of the links will be drawn downward by this action thereby swinging the arms 79 in a downward direction, as illustrated by dotted lines in FIG. 2.

The arms 79 thus rotating around the axis of the torque shaft 76 will act at their opposite ends through the stop members 84–85 to rotate the shaft 76 and thereby the dumping forks 87 to upright positions substantially as illustrated in the intermediate position shown at the left in FIG. 2. This movement need not be continued sufficiently far to pass dead center, although the extent of the movement may be varied as found desirable according to the load to be dumped.

However, in the position illustrated, the rotary actuator 77 will be sufficient to continue the rotation of the torque shaft 76 from the intermediate position when the container is turned over to discharge the contents therefrom into the hopper 7 of the packer or other device intended to receive the refuse. In the illustrated embodiment the dumping position has an angle of 55° with respect to the horizontal which, however, may vary as desired according to the construction and adjustment of the parts.

The rotation of the torque actuators 77 in the opposite direction after discharge of the contents from the container 88 will restore the container to its level position, jointly with the lengthening of the hydraulic cylinders 83. The cylinders 73 may be actuated to return the loading arms 70 to their initial positions as illustrated in full lines in FIG. 2. In these positions the container will be set down on the dock or other surface and the forks 87 lowered in the sleeves 89 sufficiently to disengage the container therefrom by an outward movement of the container relative thereto.

The several hydraulic cylinders and actuators may be controlled in the usual manner by conventional hydraulic controls the construction and connection of which are not, and need not be, described in detail. Suitable safety controls, however, are usually provided under control of the operator.

The container dumping device is shown in FIG. 5 for dumping a container from ground level to discharge the contents into a vehicle. A suitable supporting frame is shown at 51 upon which the loading arms 70 are journaled. The links 81 are also connected with the frame 51 at one end thereof. These parts are capable of swinging to upright positions, as illustrated in full lines in FIG. 5 from the dotted line position shown therein.

The parts are actuated substantially as described above to dump the contents of the container 88 into a vehicle, generally illustrated at 100. This vehicle 100 may be of any suitable or desired character, such as a truck, trailer or the like, for receiving and hauling the refuse. It may have compaction means connected therewith, if desired. In other respects, the dumping device illustrated in FIG. 5 is constructed and operated in the same manner as described above in connection with FIG. 2.

The invention is illustrated in further embodiments in FIGS. 6 to 14 as applied to a stationary packer for dumping a container therein, although it will be recognized that the invention may be used in other applications, as has been explained above.

Referring to FIGS. 6 and 9, the container 52 is constructed substantially as described above in connection with FIG. 1 and is shown as mounted on a elevated support, such as a dock, for loading into the hopper of the stationary packer. The hopper in this instance has an upstanding extension 17.

The lifting arms are indicated at 110 spaced apart on opposite sides of the stationary packer and connected together through a stabilized tube 111. The lifting arms are pivotally supported at 112 to the frame 5 of the stationary packer and at their opposite end these lifting arms have journaled therein a torque shaft 113. According to this embodiment, the torque shaft 113 has forks 114 secured thereto and offset downwardly in positions to enter sleeves 54 on the bottom of the container 52.

Also mounted on the torque shaft 113 at opposite ends thereof are mounting plates 115 which are elongated and extend to opposite sides of the torque shaft 113. The mounting plates 115 are journaled on the torque shaft to permit rotation of the shaft relative thereto.

One end of each mounting plate 115 is connected with one end of a link 116 extending downwardly parallel with the lifting arm 110 to a pivotal support 117 on the frame 5 of the stationary packer. The link 116 has a hydraulic cylinder 118 connected therein intermediate the ends of the link so as to contract or extend the latter, as described above.

The opposite end of the mounting plate 115 is connected with one end of a hydraulic cylinder 119. The opposite end of the hydraulic cylinder 119 is connected to a lever arm 120 fixed to the torque shaft 113 so as to rotate the torque shaft upon expanding movement of the lever arm 120. Upon contracting movement of the cylinder 119, the lever arm abuts a shoulder 121 on the mounting plate 115 to stop the relative rotation of the torque shaft 113.

This assembly replaces the torque actuators 64 described above and provides for use of conventional hydraulic cylinders to accomplish the rotation of the torque shaft in moving the container to a dumping position. In other respects this form of the device operates in the same manner as described above.

The torque shaft and fork assembly are illustrated more in detail in FIGS. 10 and 11, from which it will be apparent that the forks 114 are supported by mounting plates 122 which are in edgewise abutting relation against the upturned end portions of the forks 114 and are welded or otherwise secured thereto. The mounting plates 122 of the forks are secured rigidly to the torque shaft 113. These mounting plates 122 are braced by a stabilizing tube 123 extending therebetween and fixed at opposite ends to the plates 122.

The lever arms 120 are also preferably connected together at opposite sides of the fork assembly as by a tie bar 124 welded or otherwise secured to the respective lever arms. The lever arm 120 has an offset bar 125 connected therewith on which are fixed mounting plates 126, spaced apart to embrace therebetween the adjacent end of the lifting arm 110. This disposes the cylinder 119 substantially in the upright longitudinal plane of the link 116 with its tilting cylinder 118.

In the embodiment of the invention illustrated in FIG. 7 the container corresponds substantially with that illustrated in FIG. 2, as described above, and has sleeves 89 on opposite ends thereof to be engaged by lifting forks for dumping the container.

The lifting arms in this embodiment are illustrated at 130, pivotally supported on mounting pins 131 at the lower ends thereof, which extend laterally from the frame 5 of the stationary packer in the relation shown in FIG. 13.

The lifting arms 130 are operated by hydraulic cylinders 132 in the manner described above, which cylinders are connected at one end with the lifting arms and at the opposite end with mounting pins 133, as shown in FIG. 14.

Mounted on opposite sides of the frame of the packer assembly are supporting seats 134 to hold the lifting arms 130 in retracted positions, is illustrated in FIG. 7.

At their upper ends, the lifting arms 130 have journaled therein the torque shaft 135 upon which a pair of forks 136 are fixed so as to rotate with the torque shaft. The forks 136 are adapted to extend into the sleeves 89 of the container 88 when the latter is moved between the forks into coupled relation therewith.

A cylinder mounting plate is illustrated at 137, being journaled on each opposite end of the torque shaft 135 and extending to opposite sides thereof. One end of each mounting plate 137 is connected with one end of a cylinder 138, the opposite end of which cylinder is connected with a lever arm 139 which is fixed on the torque shaft 135, as described above in connection with FIGS. 6 and 9. The lever arm 139 has a portion thereof in position to engage a shoulder 140 on the end of the mounting plate 137 opposite from the mounting of the cylinder 138 thereon.

Also connected with the mounting plate 137 at each end of the torque shaft 135 is a link 141 extending therefrom to a pivotal support 142 located on a bracket mounting 143 at the side of the supporting frame 5 of the packer, as illustrated in FIG. 12. A tilting cylinder 144 is connected intermediate the ends of each link 141 to expand or contract the length of the link, as described above.

The lifting arms 130 may be braced by a suitable connecting rod 145, as shown in FIGS. 7 and 8, and which extends in bridging relation between the arms. This connecting rod 145 is bent longitudinally to clear the bottom of the container or the casters thereof when the container approaches the dumping position at the rear edge of the hopper, as shown at the left in FIG. 7.

A limit switch 146 may be used, if desired, and operated by linkage 147 from the cylinder 144 to control the return of the container. This limit switch will prevent the operator from returning the container to the dock in a dumping position and will require that the container be rotated to a level position after dumping before the arms are moved. The limit switch 146 can interlock with the hydraulic circuit to prevent damage in case the operator forgets to level the container.

The operation of this form of dumping device will be apparent from the foregoing description. The container 88 is moved into engagement with the forks 136 and the cylinders 132 are then actuated to swing the lifting arms 130 from the full line position in FIG. 7 to the dotted line position therein. During this movement, the pantograph action provided by the links 141 will serve to maintain the container level until the lifting arms 130 reach their dotted line positions and the torque shaft 135 is in dumping position. Then, upon operation of the cylinders 138, the shaft 135 is rotated to swing the forks 136 and the container 88 supported thereby to its inverted position, discharging the contents of the container into the hopper of the stationary packer or other point of discharge. Thereafter, upon contraction of the cylinders 138, the container 88 is returned to its upright position by rotation of the torque shaft 135 and the lifting arms 130 then move the container back to its supported position on the dock.

While the invention has been illustrated and described in certain embodiments, it is recognized that other variations and changes may be made therein without departing from the invention set forth in the claims.

We claim:

1. A device for dumping a container comprising lifting arms spaced apart, a torque shaft extending between the one ends of the respective lifting arms and journaled thereon, fork structure on the torque shaft for lifting the container to a dumping position upon swinging movement of the lifting arms and separable from the container, a second arm extending parallel to each of said lifting arms and having an end adjacent said one end of the lifting arm, a lever member operatively connecting said end of the second arm with the torque shaft, means pivotally mounting the arms for swinging movement, and power means operatively connected with the lifting arms for swinging the arms to move the container, said lever member causing turning movement of the torque shaft to maintain the container substantially level during said swinging movement of the lifting arms.

2. A dumping device according to claim 1, including means operatively connected with the torque shaft for rotating the shaft in the dumping position to dump the contents from the container.

3. A device for dumping a container according to claim 1, a power device connected with each of the lifting arms for swinging the arms to move the container to a dumping position, a lever member journaled on each opposite end of the torque shaft and operatively connected with the second arm of the pair, and power devices operatively connecting the lever arms with the lever members for rotating the torque shaft in dumping position.

4. A device for dumping a container according to claim 3, including a power cylinder assembly connected in the other arm of each pair for varying the length of said other arm.

5. A device for dumping a container comprising pairs of arms with the arms of each pair pivotally mounted for swinging movement in parallel relation, link means pivotally connecting the arms of each pair together at one end, means for expanding and contracting one of the arms of each pair to turn the position of the container relative thereto and to cause dumping movement of the container, one of the arms of each pair comprising a lifting arm, a power device connected with each of the lifting arms for swinging the arms to move the container to a dumping position, a torque shaft extending between the lifting arms and having container lifting means mounted thereon to lift the container to a dumping position, a lever member journaled on each opposite end of the torque shaft and operatively connected with the other arm of the pair, a lever arm fixed to the torque shaft, power devices operatively connecting the lever arm with the lever members for rotating the torque shaft in dumping position, the lever member of each pair of arms extends to opposite sides of the shaft with the other arm of the pair connected with one end of said lever member and the second-mentioned power device connected with the other end of said lever member.

6. A device for dumping a container according to claim 5, wherein each lever member has a shoulder, and abutment means carried by the container lifting means in position for engagement with the shoulder for actuation thereby.

7. A device for dumping a container comprising a pair of lifting arms, a pivotal support for one end of each of the lifting arms, a torque shaft extending between the opposite ends of the lifting arms and journaled relative thereto, fork structure mounted on the torque shaft separable from the container for supporting a container and for moving the container to a dumping position, link members extending parallel with the lifting arms, means pivotally supporting the link members at one end, lever members operatively connected with the opposite ends of the link members and journaled on the torque shaft, and means operatively connected with the lever members for rotating the torque shaft.

8. A device for dumping a container according to claim 7, including fluid power means connected in each link member intermediate the length thereof for expanding and contracting said link member in the dumping position of the container.

9. A device for dumping a container comprising a pair of lifting arms, a pivotal support for one end of each of the lifting arms, a torque shaft extending between the opposite ends of the lifting arms and journaled relative thereto, means mounted on the torque shaft for supporting a container and for moving the container to a dumping position, link members extending parallel with the lifting arms, means pivotally supporting the link members at one end, lever members operatively connected with the opposite ends of the link members and journaled on the torque shaft, each lever member having a shoulder thereon, a lever arm fixed to the torque shaft and having means in position to engage said shoulder to limit relative movement therebetween, and a hydraulic power device operatively connecting each lever arm with the adjacent lever member to rotate the torque shaft.

References Cited

UNITED STATES PATENTS

| | | | |
|---|---|---|---|
| 2,716,502 | 8/1955 | Wilson | 214—313 |
| 2,741,378 | 4/1956 | Wagner | 214—774 |
| 2,754,986 | 7/1956 | Ferro | 214—140 |
| 2,798,626 | 7/1957 | Lapsley | 214—140 |
| 2,807,379 | 9/1957 | Pilch | 214—140 |
| 3,007,590 | 11/1961 | Mathew et al. | 214—773 |
| 3,009,590 | 11/1961 | Kampert | 214—140 |
| 3,229,618 | 1/1966 | O'Connor | 100—51 |
| 3,250,414 | 5/1966 | Pioch | 214—302 |

FOREIGN PATENTS

| | | |
|---|---|---|
| 558,499 | 1/1964 | Great Britain. |

HUGO O. SCHULZ, *Primary Examiner.*